US009089239B2

(12) United States Patent
Billadeau (10) Patent No.: US 9,089,239 B2
(45) Date of Patent: Jul. 28, 2015

(54) INFUSER WITH SOLID REGION TO SELECTIVELY STOP INFUSION AND VESSEL FOR SAID INFUSER (71) Applicant: Planetary Design, Missoula, MT (US)

(72) Inventor: Scott Thadd Billadeau, Missoula, MT (US)

(73) Assignee: Planetary Design, Missoula, MT (US)

( * ) Notice: Subject to any disclaimer, the term of this patent is extended or adjusted under 35 U.S.C. 154(b) by 0 days.

(21) Appl. No.: 13/780,567

(22) Filed: Feb. 28, 2013

(65) Prior Publication Data

US 2014/0242240 A1 Aug. 28, 2014

(51) Int. Cl.
A47J 31/00 (2006.01)
A47J 31/20 (2006.01)

(52) U.S. Cl.
CPC ............... *A47J 31/005* (2013.01); *A47J 31/20* (2013.01)

(58) Field of Classification Search
CPC ..... A47J 31/005; A47J 31/02; A47J 31/0636; A47J 31/06; A47J 31/10
USPC ..................... 99/287, 297; 426/77, 78, 79, 82
See application file for complete search history.

(56) References Cited

U.S. PATENT DOCUMENTS

| 5,453,189 | A | 9/1995 | Joergensen |
| 5,478,586 | A | 12/1995 | Connor |
| 5,979,299 | A | 11/1999 | Hornsby et al. |
| 7,194,951 | B1 | 3/2007 | Porter |
| 7,213,507 | B2 * | 5/2007 | Glucksman et al. ............ 99/297 |
| 7,231,507 | B2 | 6/2007 | Seal et al. |
| 8,695,485 | B2 * | 4/2014 | Spitzley et al. ................. 99/297 |
| 2005/0199129 | A1 * | 9/2005 | Glucksman et al. ............ 99/279 |
| 2010/0119674 | A1 * | 5/2010 | Frank et al. .................... 426/435 |
| 2011/0048240 | A1 * | 3/2011 | Siu .................................. 99/285 |
| 2012/0012008 | A1 | 1/2012 | Kwok |
| 2012/0216682 | A1 * | 8/2012 | Bodum .......................... 99/297 |

FOREIGN PATENT DOCUMENTS

| GB | 20121 | * | 3/1911 |
| GB | 2249021 | * | 4/1992 |

* cited by examiner

*Primary Examiner* — Anthony Weier
(74) *Attorney, Agent, or Firm* — Merchant & Gould P.C.

(57) ABSTRACT

An infuser having a non-porous region to selectively stop infusion. The infuser may be used in a vessel, such as a portable beverage mug suitable for preparing and drinking tea and other beverages. Methods for infusing contents (such as coffee or tea) into a beverage with the ability to stop the infusion process on command, and without having to remove the contents from the container or vessel holding the infuser. Once the beverage has reached a desired flavor, the flavoring ingredients can be pushed into the non-porous section of the infuser by pushing a press head to move the infusing contents into the non-porous region.

11 Claims, 8 Drawing Sheets

INFUSER WITH SOLID REGION TO SELECTIVELY STOP INFUSION AND VESSEL FOR SAID INFUSER

FIELD

This disclosure relates to an infuser for infusing contents (such as coffee or tea) into a beverage. In particular, this disclosure relates to an infuser having a non-porous region to selectively stop the infusion. The infuser may be used in a vessel, such as a portable beverage mug suitable for preparing, transporting and drinking tea and other beverages. Methods are provided for infusing contents (such as coffee or tea) into a beverage with the ability to stop the infusion process on command, and without having to remove the contents from the container or vessel holding the infuser.

BACKGROUND

Flavored beverages can be prepared by steeping flavoring ingredients, such as tea leaves, herbs or coffee, in hot or cold water. During steeping, the water is infused with flavors that are extracted from the flavoring ingredient. The flavoring ingredients can be removed from the water after optimal flavor has been reached. This can be messy and inconvenient.

It would be helpful to have a way of infusing flavoring ingredients, such as tea leaves or coffee grains, into a beverage in a vessel and then be able to stop the infusion when desired and not be required to remove the flavoring ingredients from the vessel.

Many people prefer to transport beverages in portable beverage containers. It would be beneficial to provide for a portable beverage container that can also be used for preparing flavored beverages. It would also be beneficial to provide for a portable beverage container that allows for the removal of flavoring ingredients from the beverage after optimal flavor has been achieved and after the infused beverage has been consumed.

SUMMARY

In one aspect, an infuser for use in a vessel includes a surrounding infuser wall including a porous section and a non-porous section; a closed bottom at an end of the infuser wall; the surrounding infuser wall and closed bottom enclosing an infuser interior volume therein; the non-porous section extending from the closed infuser bottom at least 10% of a length of the infuser wall; and an infuser press assembly including a press head fittable within the infuser wall; the press head being movable along at least a portion of an inner portion of the infuser wall and constructed and arranged to push any solid material in the infuser interior volume to a volume enclosed by the non-porous section.

In another aspect, a portable beverage mug is provided. The portable beverage mug comprises a cup having a cup wall, a cup bottom, a mouth opposite of the cup bottom, and an interior volume defined by the cup wall and the cup bottom. The portable beverage mug also comprises an infuser capable of being removably secured within the interior volume of the cup; the infuser including a surrounding infuser wall and a closed infuser bottom; the infuser wall including at least a porous section; and an infuser press assembly including a press head fittable within the infuser wall; the press head being movable along at least a portion of an inner portion of the infuser wall.

In another aspect, a method of making a beverage includes providing a vessel having a wall, a bottom, a mouth opposite of the bottom, and an interior volume defined by the wall and the bottom; putting liquid in the interior volume; putting a solid flavoring material into an infuser; the infuser including a surrounding infuser wall and a closed infuser bottom; the infuser wall including a porous section and a non-porous section adjacent to the closed infuser bottom; removably securing the infuser within the interior volume of the vessel; and moving a press head in the infuser wall toward the closed infuser bottom to move at least some of the solid flavoring material into a region enclosed by the non-porous section and the closed infuser bottom.

DETAILED DESCRIPTION

Flavored beverages, such as tea, herbal tea, or coffee, can be prepared by infusion (i.e., steeping) by immersing flavoring ingredients in hot or cold water, whereby some of the flavors in the flavoring ingredients are transferred into the water. Optimal conditions, such as temperature of the water and infusion time, depend on the type of beverage, the desired flavor, and personal preference. For example, some teas (e.g., black tea) can be steeped for about 3-5 minutes in 96° C. water for optimal flavor, whereas other teas (e.g., white tea) can be steeped for about 1-2 minutes in 80-85° C. water for optimal flavor.

A common problem with steeping tea is that if the flavoring ingredients (i.e. tea leaves) are left to steep for a long time, increasing amounts of tannins and other components are extracted into the water, rendering the resulting beverage bitter. This problem can be exacerbated when tea is steeped in a portable beverage mug, as there is often no convenient way to remove the tea leaves from the water after optimum flavor has been achieved and the steeping continues as long as the tea leaves are in contact with the water. Some portable beverage mugs may include an infuser that keeps the tea leaves from entering the mouth when drinking the beverage, but the leaves are still in contact with the water through the porous infuser walls and continue to infuse the water with flavor components and tannins.

The present disclosure provides for an infuser for infusing contents (such as coffee or tea) into a beverage. In particular, this disclosure relates to an infuser having a non-porous (or solid) region to selectively stop the infusion. The infuser may be used in a vessel, such as a portable beverage mug suitable for preparing, transporting and drinking tea and other beverages. Methods are provided for infusing contents (such as coffee or tea) into a beverage with the ability to stop the infusion process on command, and without having to remove the contents from the container or vessel holding the infuser. A vessel, such as a portable beverage mug, is described for preparing beverages by infusion that allows for the separation of the flavoring ingredients (e.g., tea leaves) from the prepared beverage after optimal flavor has been achieved. The flavoring ingredients can be separated from the prepared beverage with a simple push of a press and without the need for a messy removal of the infuser or the flavoring ingredients from the mug before enjoying the beverage.

While some teas need to steep for only a short time (less than a few minutes), many herbal teas or ground cacao needs to steep for 6 to 10 minutes. Thus, a wide variety of timing is needed for proper infusion, and being able to stop the infusion on command is helpful.

An infuser constructed in accordance with principles of this disclosure is shown at reference numeral 30 in FIGS. 2, 3, and 6-8. The infuser 30 can be used to hold flavoring ingredients, allowing for the infusion of the beverage with flavors from the flavoring ingredients during preparation of the beverage. The infuser 30 will include a porous section 35 and a non-porous (or solid) section 36 as part of its surrounding infuser wall 33, and is usable in a vessel, such as a pot or a portable beverage mug 10 (described further below). After material (such as tea) has infused in the liquid in the vessel to a desired level, the user is able to selectively, and on command, stop the infusion by moving the material into the non-porous section 36 of the infuser 30. In one example, an infuser press assembly 40 can be used to separate the flavoring material from the beverage, and move the flavoring material into the non-porous section 36 of the infuser 30. Example embodiments are described further below.

Figure 1:
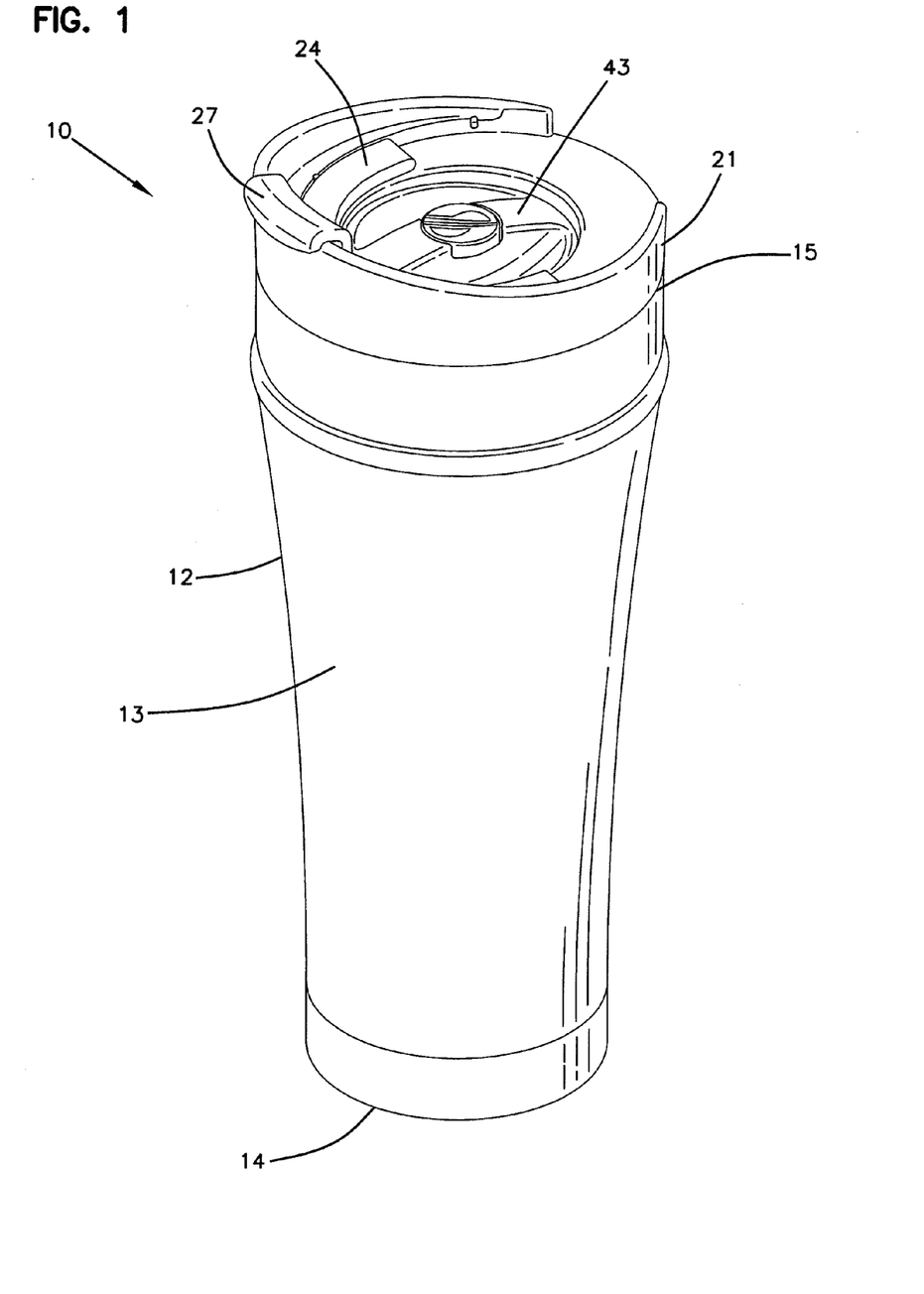
FIG. 1 is a perspective view of one embodiment of portable beverage mug using an infuser, constructed in accordance with principles of this disclosure.

In FIG. 1, the infuser 30 is shown used in one example in the form of a portable beverage mug 10. The portable beverage mug 10 comprises a cup 12 covered by a removable lid 21. The portable beverage mug 10 can be used to prepare, transport and enjoy hot or cold beverages such as tea, herbal tea or coffee. The portable beverage mug 10 can be generally cylindrical in shape and may have straight or curved walls that may be tapered toward the bottom, as shown in the exemplary embodiment of FIG. 1. Many different shapes and sizes of the portable beverage mug 10 are possible. The mug may also optionally include a handle (not shown).

Figure 2:
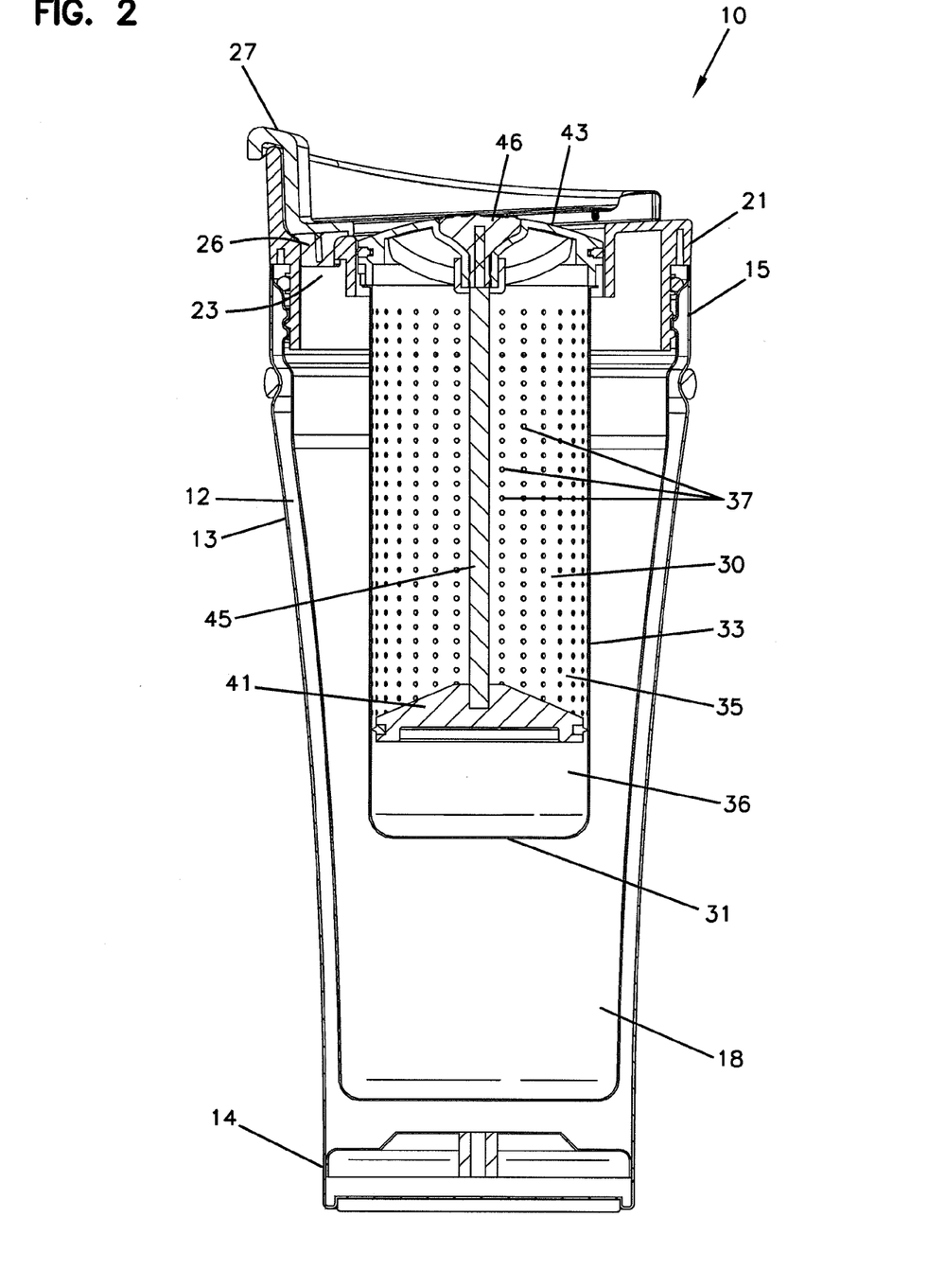
FIG. 2 is a cross-sectional view of the portable beverage mug of FIG. 1.

The cup 12 includes cup walls 13, a bottom 14, and a mouth 15 opposite of the cup bottom 14. The cup walls 13 and bottom 14 define an interior volume 18. The cup 12 can be used to prepare and contain the beverage. The outside dimensions of the cup 12 can be such that the portable beverage mug 10 fits into most cup holders, such as those found in vehicles. The cup 12 may be constructed of any suitable material, such as metal (e.g., stainless steel), plastic, glass, or combinations thereof.

The walls of the cup 12 may be constructed to provide thermal insulation. For example, as seen in FIG. 2, the cup 12 may have a double-wall construction and may optionally comprise a vacuum between the walls, or the walls may comprise insulating materials.

The interior volume 18 of the cup 12 may be any suitable volume that is capable of accommodating the preparing, transporting and containing of beverages. Typical volumes of portable beverage mugs range from 250 mL to 750 mL, but other volumes are also possible.

The portable beverage mug 10 includes infuser 30, as shown in FIGS. 2, 3, 6, and 7. The infuser 30 can be generally cylindrical in shape (other shapes are usable), having a closed infuser bottom 31, surrounding infuser wall 33, and a top opening 32. The infuser 30 can be at least partially disposed in the interior volume 18 of the cup 12, removably secured in place by removable attachment to the lid 21. The infuser 30 can be used to hold flavoring ingredients, allowing for the infusion of the beverage with flavors from the flavoring ingredients during preparation of the beverage. The infuser wall 33 and the closed infuser bottom 31 define an interior volume 34 of the infuser 30. The infuser wall 33 may have a rim 38 along its top opening 32 that allows the infuser 30 to fit into an opening 22 of the lid 21 without falling through. The lid 21 may further comprise a shoulder 212 along the inside surface of the opening 22.

The infuser wall 33 includes the porous section 35 and the non-porous section 36. The porous section 35 of the infuser wall 33 includes a multiplicity of pores 37 that facilitate the preparation of the beverage by allowing the interior volume 34 of the infuser 30 to be in fluid connection with the interior volume 18 of the cup 12 during preparation of the beverage. The pores 37 may be selected to be any size that is suitable for brewing beverages such as tea or coffee. The pore size may be selected to be such that water can flow in and out of the infuser 30, but flavoring ingredients, such as tea leaves or coffee grounds, cannot, and thus stay inside the infuser 30. For example, the pores 37 may be approximately 2 mm or smaller in diameter, or approximately 1.5 mm or smaller, or approximately 1 mm or smaller, or approximately 0.5 mm or smaller.

In accordance with the embodiment of FIGS. 2, 3, 6, and 7, the porous section 35 may extend upward from above the non-porous section 36 and may extend to near the top opening 32 of the infuser 30.

Figure 3:
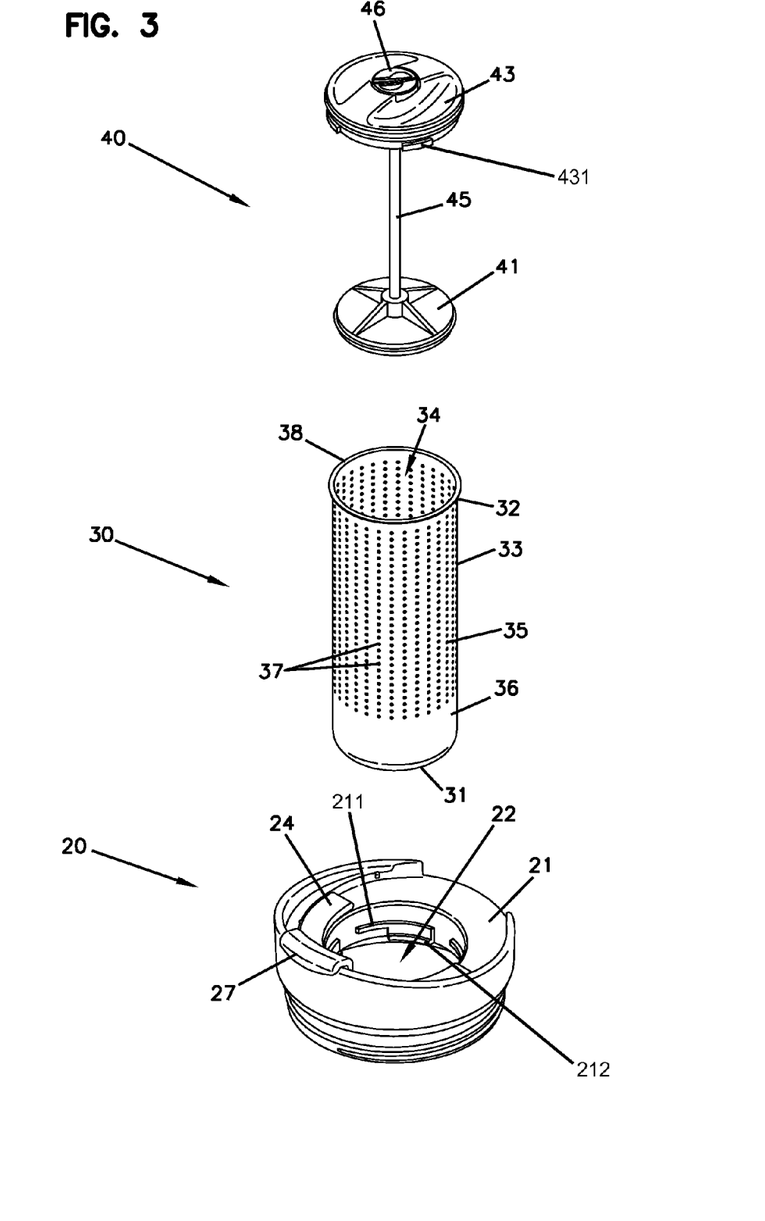
FIG. 3 is an exploded perspective view of an infuser press assembly, infuser, and lid assembly for the portable beverage mug of FIGS. 1 and 2.

According to an aspect of the disclosure shown in FIGS. 2 and 3, the non-porous section 36 of the infuser wall 33 may extend at least some distance upward from the closed infuser bottom 31. According to an embodiment, the non-porous section 36 extends at least 10% of the length of the infuser wall 33 from the closed infuser bottom 31. In preferred embodiments, the non-porous section 36 can extend no more than 60% of the length of the infuser wall 33. In some example embodiments, the non-porous section 36 extends from about 20% to about 50% of the length of the infuser wall 33.

As mentioned previously, the infuser press assembly 40 can be provided to separate the flavoring ingredients from the beverage after the preparation of the beverage, and move the flavoring ingredients to the non-porous section 36 of the infuser 30. In accordance with the example embodiment shown in FIGS. 3 and 4, the portable beverage mug 10 includes infuser press assembly 40. The infuser press assembly 40 can be removably secured to the lid 21 of the portable beverage mug 10, securing the infuser 30 in place. The infuser press assembly 40 can be used to separate the flavoring ingredients from the beverage after the preparation of the beverage.

Many embodiments for the infuser press assembly 40 are possible. In the example shown, the infuser press assembly 40 includes a press head 41 that is sized to fit slidably inside the infuser 30. In this particular embodiment, the press head 41 may be generally in the shape of a round disk that may be radially supported by ribs 47, as shown in the exemplary embodiment of FIGS. 3 and 4. Other suitable constructions of the press head 41 are possible.

Figure 4:
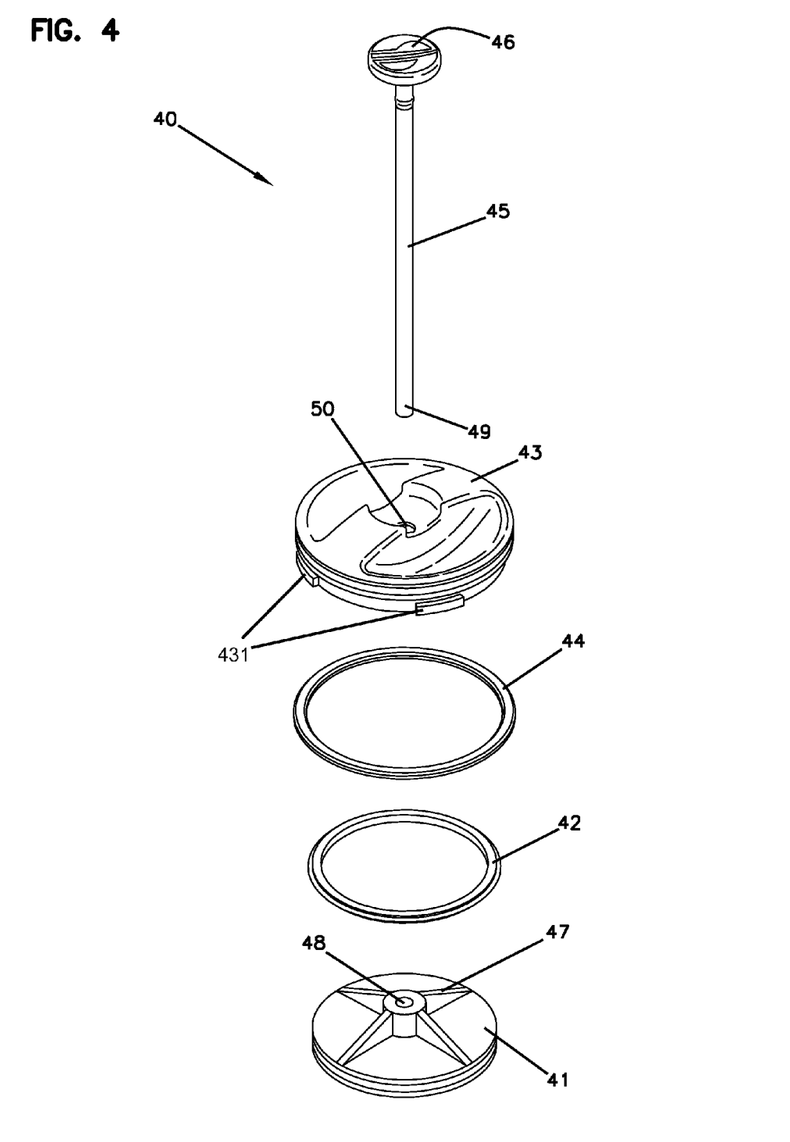
FIG. 4 is an exploded perspective view of an infuser press assembly for the portable beverage mug of FIGS. 1 and 2.

The top of the press head 41 may be secured to the rod 45, for example, at the bottom end 49 of the rod 45. The rod 45 is usable to move the press head 41 up and down inside the infuser 30. The opposite end of the rod 45 may comprise a rod head 46 that can be used for pushing the press head 41 down to a lowered position toward the infuser bottom 31, or for pulling the press head 41 up to an upper position toward the top of the infuser 30. The bottom end 49 of the rod 45 may include screw threads (not shown) that can engage corresponding threads in an opening 48 at the top of the press head 41. Other attachment mechanisms are also possible.

According to an embodiment shown in FIGS. 2 and 7, the length of the rod 45 and the length of the porous and non-porous sections 35, 36 are selected such that when the press head 41 is in the lowered position, the press head 41 is positioned at or below the border between the porous and non-porous sections 35, 36 of the infuser wall 33. Therefore, when the press head 41 is in the lowered position, the porous section 35 of the infuser wall 33 remains above the press head 41, and the space below the press head 41 is enclosed by mainly the press head 41, the non-porous section 36 of the infuser wall 33, and the closed infuser bottom 31.

The infuser press assembly 40 may also include an infuser closure 43, as seen in FIGS. 2-4, 6 and 7. The infuser closure 43 may be sized to fit removably in the opening 22 of the lid 21. In accordance with the example embodiment illustrated, the infuser closure 43 can be used to secure the infuser 30 and the infuser press assembly 40 in place so that at least a part of the infuser 30 is disposed within the interior volume 18 of the cup 12, while the press head 41 can be moved up and down within the infuser 30, and while at least one end of the rod 45 or a rod head 46 is operationally accessible from the outside of the cup 12. The infuser closure 43 may have an aperture 50 at or near its center through which the rod 45 can slidably fit. The infuser closure 43 may include a mechanism, such as threads 431, that allows for the infuser closure 43 to be secured into place within the opening 22 on the lid 21. The lid may further comprise one or more engagement members 211 along the inside surface of the opening 22. The press head 41, infuser closure 43, and rod 45 may be constructed of any suitable material, such as plastic, metal, or combinations thereof.

The infuser press assembly 40 can include a first seal member 42. The first seal member 42 can be fitted around the outside perimeter of the press head 41 and can form a seal between the press head 41 and the inside portion of the infuser wall 33 when the press head 41 is inserted into the infuser 30.

The infuser press assembly 40 may also include a second seal member 44. The second seal member 44 can be positioned around the perimeter of the infuser closure 43 can form a seal between the infuser closure 43 and the lid 21 when the infuser closure 43 is attached to the lid 21 in a secured position.

According to preferred embodiments, the first and second seal members 42, 44 form fluid tight seals. The seal members 42, 44 may comprise any material with suitable elasticity, for example rubber or silicone.

In accordance with the embodiments of FIGS. 1-3 and 5-7, the portable beverage mug 10 may include a removable lid 21. The lid 21 can be used to selectively cover the mouth 15 of the cup 12, as shown in FIGS. 1, 2, 6 and 7. The lid 21 will typically be shaped to fit the mouth 15 of the cup 12.

In the particular example shown in the drawings, the lid 21 is generally cylindrical in shape. The lid 21 can have an opening 22 to accommodate the infuser 30 and the infuser press assembly 40. In the example shown, the opening 22 is illustrated as being at about the center of the lid 21, but other regions are possible.

Figure 5:
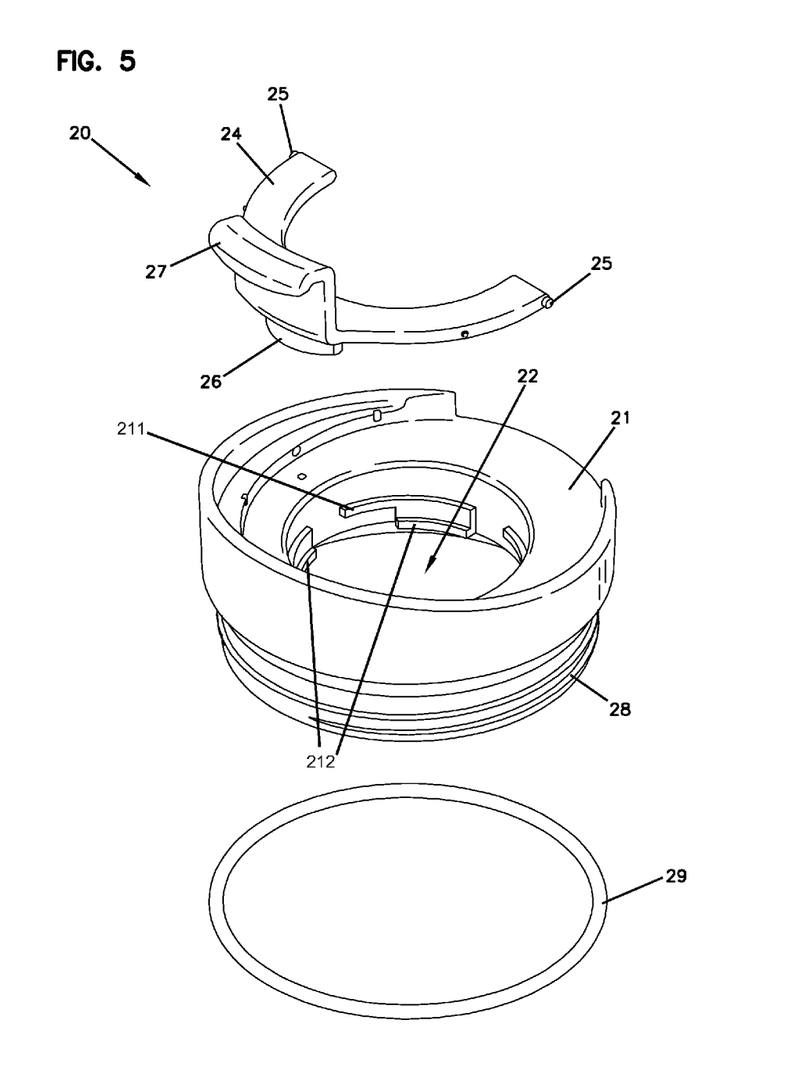
FIG. 5 is an exploded perspective view of a lid assembly for the portable beverage mug of FIGS. 1 and 2.

A lid assembly 20, comprising the lid 21, a lid seal 29 and the lid closure 24, is shown in FIG. 5. The lid 21 may also include a drinking aperture 23 that can be closed by the lid closure 24.

The lid 21 can serve multiple purposes. For example, in addition to insulating the beverage and facilitating drinking of the beverage, the lid 21 can also secure the infuser 30 and the infuser press assembly 40 in place on the inside of the cup to facilitate the preparation of the beverage.

The lid 21 may include threads 28 that allows for the lid 21 to be removably secured to the mouth 15 of the cup 12. The cup walls 13 may include threads that are capable of engaging the corresponding threads 28 of the lid 21. The lid 21 may alternatively be secured onto the mouth 15 of the cup 12 by another suitable closure mechanism, such as a press seal.

The lid seal 29 fits between the lid 21 and the cup walls 13 forming a seal when the lid 21 is secured onto the cup 12.

The drinking aperture 23 of the lid 21 (shown in FIG. 2) is in fluid connection with the interior volume 18 of the cup 12. The drinking aperture 23 may be of any suitable shape. For example, the shape of the drinking aperture 23 may approximate a circle, a semicircle, or an oval.

The lid closure 24 used to close the drinking aperture 23 may be connected to the lid 21 by a hinge mechanism 25. The lid closure 24 may include a protrusion 26 on the underside of the closure that fits into and can close the drinking aperture 23 when the lid closure 24 is in a closed position, forming an essentially fluid tight seal. The lid closure 24 may be generally semicircular in shape and may also include an extension 27 that extends beyond a lip of the lid 21, and that can be used for pushing the closure open or closed. Other shapes and configurations of the lid closure 24 and the drinking aperture 23 are possible.

The lid 21, lid closure 24, and lid seal 29 can be made of any suitable material, such as plastic, rubber, metal, or combinations thereof.

Figure 6:
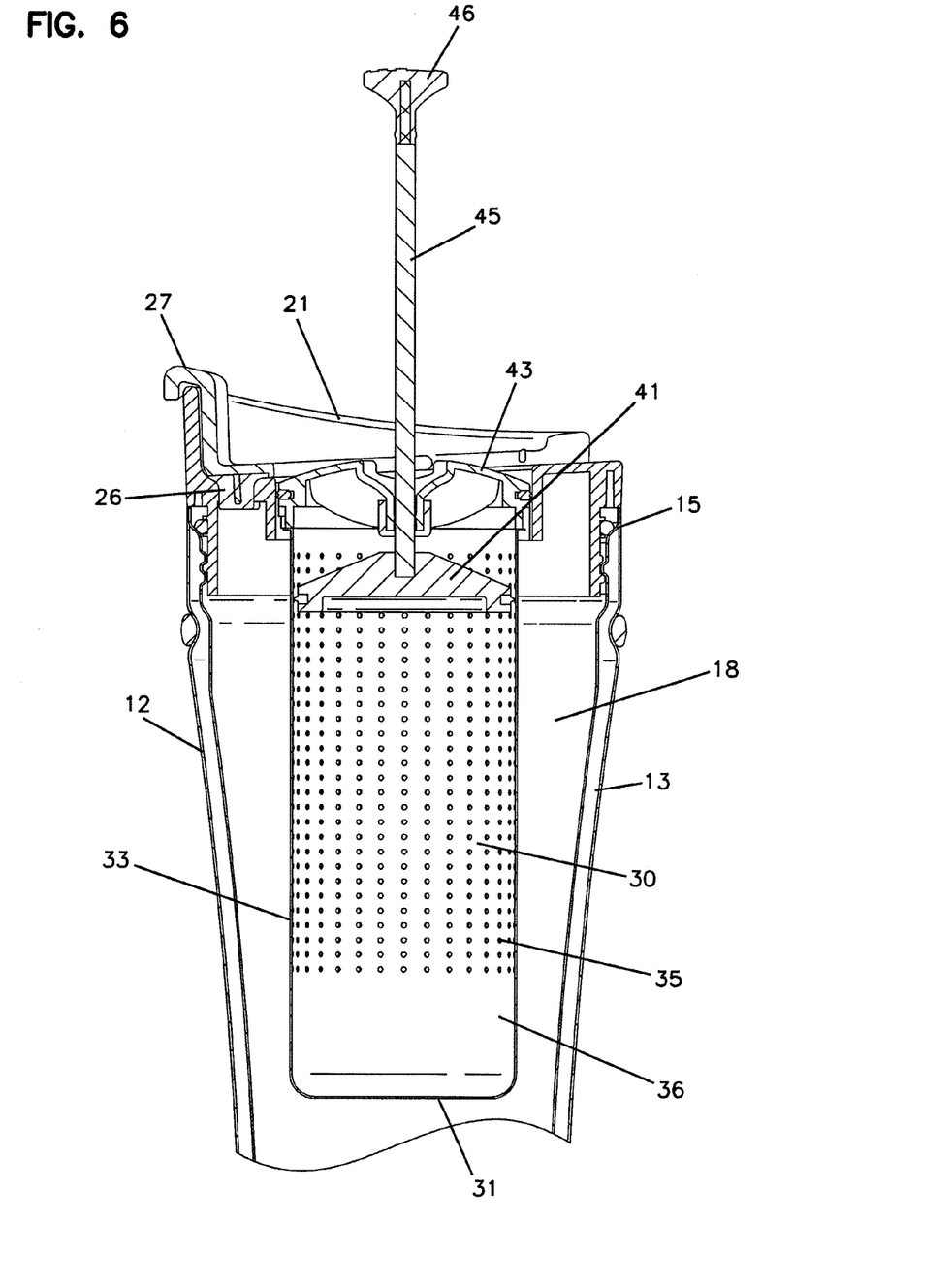
FIG. 6 is a partial cross-sectional view of the portable beverage mug of FIGS. 1 and 2 with a press head in an upper position.
Figure 7:
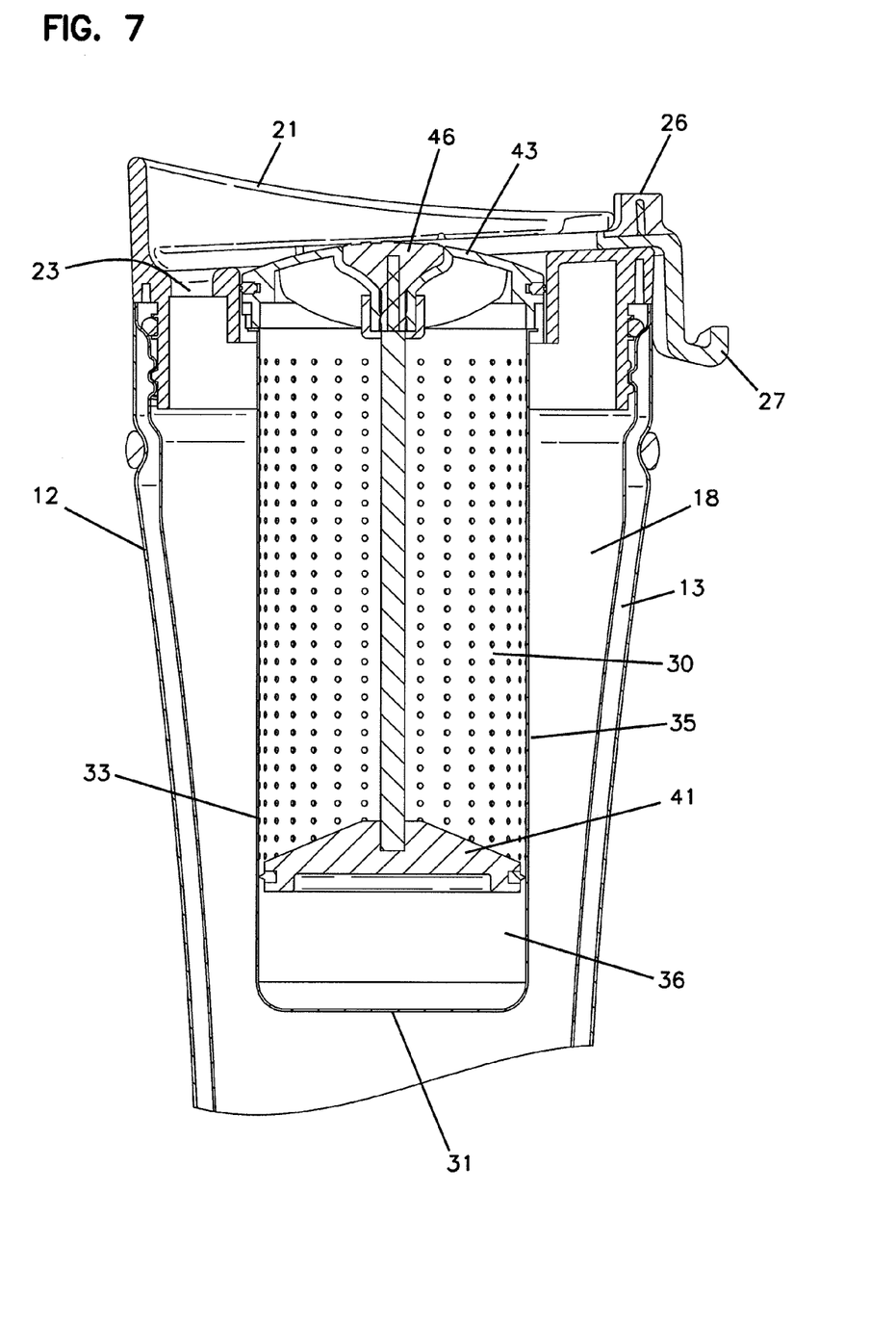
FIG. 7 is a partial cross-sectional view of the portable beverage mug of FIGS. 1 and 2 with a press head in a lowered position.

FIGS. 6 and 7 are cross sectional views depicting the functioning of the portable beverage mug 10 according to an embodiment. Flavored beverages, such as tea, herbal tea, or coffee, can be prepared by placing flavoring ingredients (e.g., tea leaves or coffee) in the infuser 30 and immersing the flavoring ingredients in liquid (e.g., hot water) by placing the infuser 30 at least partially inside the cup 12 containing the liquid, and securing the infuser closure 43 to the lid 21. In accordance with an embodiment as seen in FIGS. 6 and 7, the press head 41 remains in the upper position during steeping. When the press head 41 is in the upper position, the press head 41 can be positioned near the infuser closure 43 or in a position where at least some of the pores 37 of the porous section 35 are below the press head 41 so that the interior volume 34 of the infuser 30 is in fluid connection with the interior volume 18 of the cup 12. When the press head 41 is in the upper position, liquid can move in and out of the infuser 30 through the pores 37 of the porous section 35 of the infuser wall 33, allowing the liquid (e.g., hot water) to be infused with the flavors of the flavoring ingredient (e.g., tea leaves or coffee).

When a desired level of flavoring has been achieved (e.g., after a few minutes of steeping), the press head 41 can be lowered to a lowered position by pushing down on the rod head 46. While in the lowered position (FIG. 7), the press head 41 is at or near the border between the non-porous section 36 and the porous section 35 of the infuser wall 33 so that substantially all of the porous section 35 remains above the press head 41. The press head 41, the non-porous section 36 of the infuser wall 33 and the closed infuser bottom 31 define a space that is no longer in fluid connection with the rest of the interior volume 18 of the cup 12. When the press head 41 is lowered to the lowered position, any particles (e.g., tea leaves or coffee grounds) contained in the infuser 30 are also pushed down and are essentially contained in the enclosed space defined by the press head 41, the non-porous section 36 of the infuser wall 33 and the closed infuser bottom 31. Therefore, lowering the press head 41 to the lowered position prevents further infusion that could extract undesirable flavors from the flavoring ingredients, and could result, for example, in excessive bitterness of the beverage.

According to an embodiment, after the beverage has been prepared and the press head 41 and rod 45 are in the lowered position, the lid closure 24 can be opened so that the beverage can be enjoyed through the drinking aperture 23.

A method of making a beverage can employ principles of this disclosure. The method can include providing a vessel, such as mug 10 for example, although other vessels can be used, having wall 13, bottom 14, mouth 15 opposite of the bottom 14, and interior volume 18 defined by the wall 13 and the bottom 14. The method can include putting liquid in the interior volume 18; putting a solid flavoring material (such as tea leaves, coffee grounds, etc.) into the infuser 30. The infuser 30 includes surrounding infuser wall 33 and closed infuser bottom 31. The infuser wall 33 includes porous section 35 and non-porous section 36 adjacent to the closed infuser bottom 31.

The method includes removably securing the infuser 30 within the interior volume 18 of the vessel; and pushing press head 41 along the infuser wall 33 toward the closed infuser bottom 31 to move at least some of the solid flavoring material (such as tea) into a region enclosed by the non-porous section 36 and the closed infuser bottom 31.

Of course, the step of putting liquid in the interior volume 18 can occur either before or after the step of putting the solid flavoring material into the infuser 30.

When the vessel is portable mug 10, the method can further include mounting lid 21 operably to cover the mouth 15 of the vessel or cup 12.

The step of removably securing the infuser 30 can include removably attaching the infuser 30 and the lid 21 together.

The step of putting a solid flavoring material into the infuser 30 can include putting the solid flavoring material, such as tea, through top opening 32 in the infuser 30 and then placing the infuser closure 43 over the top opening 32.

The step of pushing press head 41 along the infuser wall 33 includes pushing rod 45 connected to the press head 41, the rod 45 extending through aperture 50 in the infuser closure 43.

Figure 8:
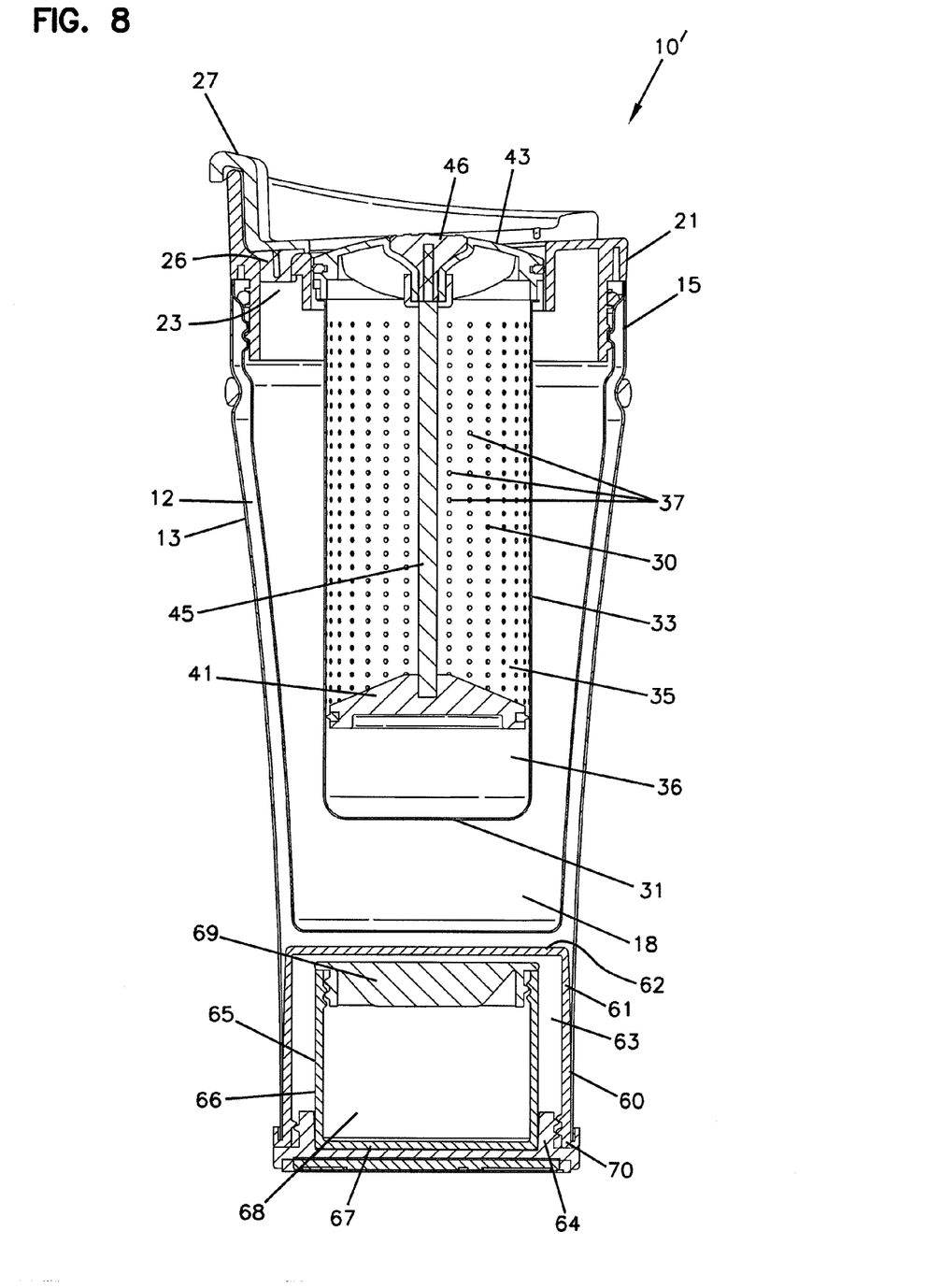
FIG. 8 is a cross-sectional view of an alternative embodiment of the portable beverage mug.

An alternative embodiment of the beverage mug is shown in FIG. 8 at 10'. The portable beverage mug 10' may be constructed to comprise a storage compartment 60. The storage compartment 60 may be used to store, for example, flavoring ingredients, such as tea, herbal tea or coffee. The storage compartment 60 may comprise storage compartment walls 61, a storage compartment bottom 62, and a storage compartment mouth 70 opposite of the storage compartment bottom 62. The storage compartment walls 61 and storage compartment bottom 62 define a storage compartment interior volume 63.

The storage compartment 60 may be integrally mounted onto the bottom of the beverage mug 10 such that the storage compartment bottom 62 abuts the bottom 14 of the cup, and that the storage compartment mouth 70 faces downward when the beverage mug 10 is in an upright position. The storage compartment closure 64 can be used to threadedly close the storage compartment mouth 70.

In accordance with the alternative embodiment of FIG. 8, a storage container 65 that is removably fittable in the storage compartment interior volume 63 can be used to hold the flavoring ingredients stored in the storage compartment 60. The storage container 65 may include storage container walls 66, storage container bottom 67, and a storage container interior volume 68 defined by the storage container walls 66 and storage container bottom 67. The storage container can be operatively threadedly closed by a storage container closure 69.

While certain embodiments of the disclosure have been described, other embodiments may exist. While the specification includes a detailed description, the disclosure's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments of the disclosure. Various other aspects, embodiments, modifications, and equivalents thereof which, after reading the description herein, may suggest themselves to one of ordinary skill in the art without departing from the spirit of the present disclosure or the scope of the claimed subject matter.

What is claimed is:

1. A portable beverage mug comprising:
   (a) a cup having a cup wall, a cup bottom, a mouth opposite of the cup bottom, and an interior volume defined by the cup wall and the cup bottom;
   (b) a lid operably mounted on the cup to selectively cover the mouth of the cup, the lid comprising a center opening;
   (c) an infuser removably mounted onto the center opening of the lid and secured within the interior volume of the cup; the infuser including a surrounding infuser wall, a top opening, and a closed infuser bottom opposite of the top opening; the infuser wall including at least a porous section and a rim along the top opening; and
   (d) an infuser press assembly including:
      (i) a press head fittable within the infuser wall; the press head being movable along at least a portion of an inner portion of the infuser wall; and
      (ii) an infuser closure mountable on the top opening, the infuser closure comprising threading constructed to removably secure the infuser to the lid.

2. A portable beverage mug according to claim 1 wherein:
   (a) the infuser wall further includes a non-porous section; the non-porous section extending from the closed infuser bottom at least 10% of a length of the infuser wall.

3. A portable beverage mug according to claim 1 wherein:
   (a) the non-porous section of the infuser wall extends from the closed infuser bottom no greater than 60% of a length of the infuser wall.

4. A portable beverage mug according to claim 1 wherein:
   (a) the infuser press assembly includes a rod secured to the press head, wherein movement of the rod moves the press head along the inner portion of the infuser wall.

5. A portable beverage mug according to claim 4 wherein:
   (a) the infuser closure has an aperture slidably accommodating the rod.

6. A portable beverage mug according to claim 1 wherein:
   (a) the lid includes a drinking aperture therethrough in fluid communication with the interior volume of the cup.

7. A portable beverage mug according to claim 1 wherein:
   (a) the press head includes a seal member secured to the head and being between and against the press head and the inner periphery of the infuser wall.

8. A portable beverage mug according to claim 1, wherein:
   (a) the lid is removably secured to the cup with one of a threaded connection or a press seal connection.

9. A portable beverage mug according to claim 1, wherein:
(a) the lid comprises a shoulder along the center opening.

10. A portable beverage mug according to claim 1, wherein:
(a) the rim is constructed to prevent the infuser from falling through the opening of the lid.

11. A portable beverage mug according to claim 1, wherein:
(a) the lid comprises one or more engagement elements along the center opening.

* * * * *